(12) United States Patent
Suzuki et al.

(10) Patent No.: US 8,075,949 B2
(45) Date of Patent: Dec. 13, 2011

(54) METHOD OF PRODUCTION OF A CONDUCTIVE PARTICLE, CONDUCTIVE PASTE, AND METHOD OF PRODUCTION OF ELECTRONIC DEVICE

(75) Inventors: Kazutaka Suzuki, Narita (JP); Shigeki Sato, Narita (JP)

(73) Assignee: TDK Corporation, Tokyo (JP)

( * ) Notice: Subject to any disclaimer, the term of this patent is extended or adjusted under 35 U.S.C. 154(b) by 1274 days.

(21) Appl. No.: 11/663,981

(22) PCT Filed: Sep. 28, 2005

(86) PCT No.: PCT/JP2005/017890
§ 371 (c)(1),
(2), (4) Date: Mar. 28, 2007

(87) PCT Pub. No.: WO2006/035840
PCT Pub. Date: Apr. 6, 2006

(65) Prior Publication Data
US 2008/0035244 A1    Feb. 14, 2008

(30) Foreign Application Priority Data
Sep. 29, 2004  (JP) .................. 2004-284287

(51) Int. Cl.
*B05D 7/00* (2006.01)
*H01G 7/00* (2006.01)
*C23C 22/24* (2006.01)
*H01B 1/22* (2006.01)

(52) U.S. Cl. ....... 427/216; 29/25.42; 148/266; 252/513; 427/217

(58) Field of Classification Search .............. 29/25.42; 148/266, 513; 252/513, 514; H01B 1/12
See application file for complete search history.

(56) References Cited

U.S. PATENT DOCUMENTS

| | | | | |
|---|---|---|---|---|
| 5,985,466 A | * | 11/1999 | Atarashi et al. | 428/570 |
| 6,325,910 B1 | * | 12/2001 | Meyer et al. | 205/159 |
| 2001/0013263 A1 | * | 8/2001 | Yamaguchi et al. | 75/255 |
| 2002/0146564 A1 | * | 10/2002 | Takai et al. | 428/403 |
| 2006/0138590 A1 | * | 6/2006 | Suzuki et al. | 257/532 |

FOREIGN PATENT DOCUMENTS

| | | |
|---|---|---|
| JP | A 02-066101 | 3/1990 |
| JP | A 03-126206 | 5/1991 |
| JP | A 05-287305 | 11/1993 |

(Continued)

*Primary Examiner* — Jessica L Ward
*Assistant Examiner* — Alexander Polyansky
(74) *Attorney, Agent, or Firm* — Oliff & Berridge, PLC

(57) ABSTRACT

A method of production of conductive particles able to suppress growth of the conductive particles at the firing stage, able to effectively prevent spheroidization and electrode disconnection, able to effectively suppress a drop in electrostatic capacity, and able to efficiently produce core particles covered by thin coating layers without abnormal segregation of the coating layer metal particularly even when the internal electrode layers are reduced in thickness. A method of producing conductive particles comprising cores 51 having nickel as their main ingredients and coating layers 52 covering their surroundings. A core powder, a water-soluble metal salt containing a metal or alloy forming the coating layers 52, and a surfactant (or water-soluble polymer compound) are mixed to deposit by reduction a metal or alloy for forming the coating layers 52 on the outer surfaces of the core powder. The metal or alloy forming the coating layers 52 has at least one type of elements selected from Ru, Rh, Re, and Pt as a main ingredient.

19 Claims, 7 Drawing Sheets

FOREIGN PATENT DOCUMENTS

| | | |
|---|---|---|
| JP | A 08-212827 | 8/1996 |
| JP | A 10-214520 | 8/1998 |
| JP | A 2004-036417 | 2/2004 |
| JP | A 2004-319435 | 11/2004 |
| WO | WO 2004/070748 A1 | 8/2004 |
| WO | WO 2004070748 A1 * | 8/2004 |

* cited by examiner

FIG.2
(A)
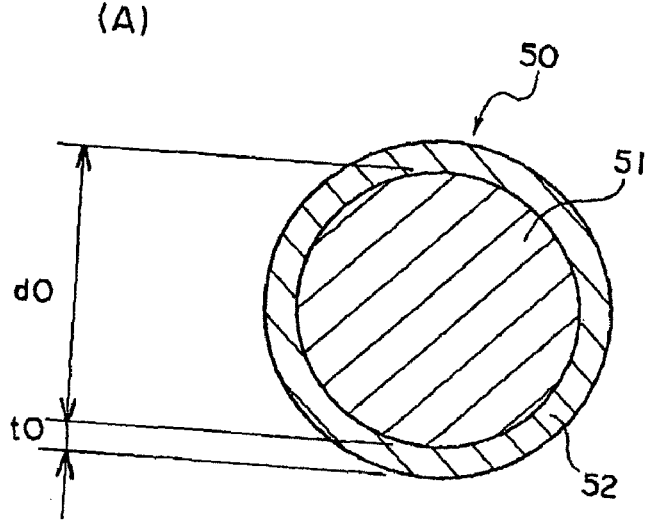
(B)
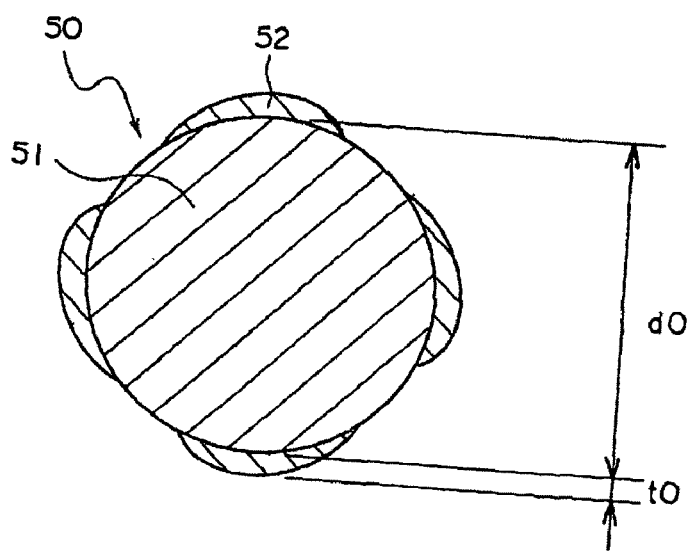

FIG.4
(A)
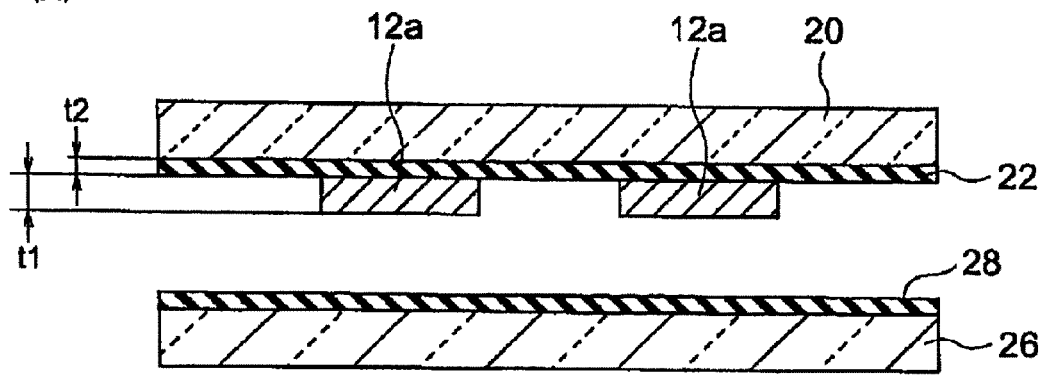
(B)
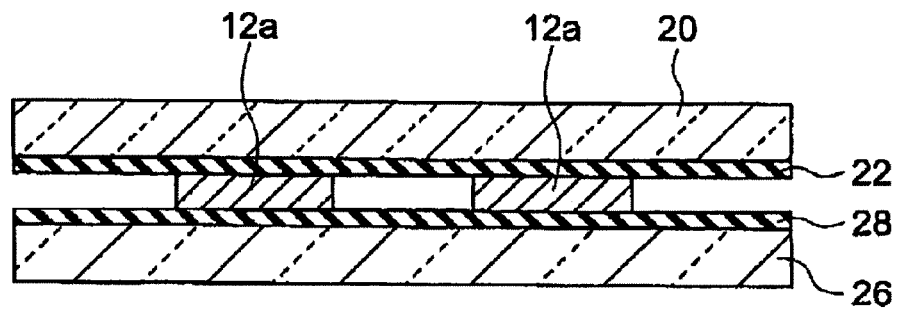
(C)
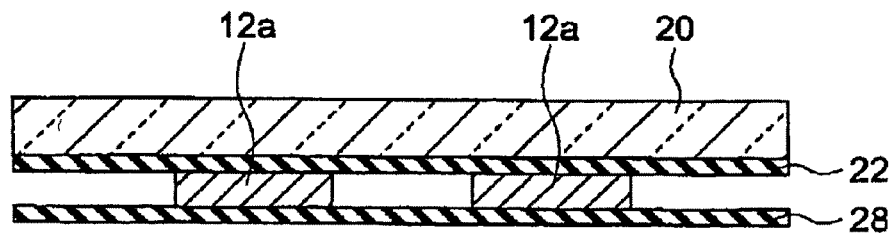

FIG.5
(A)
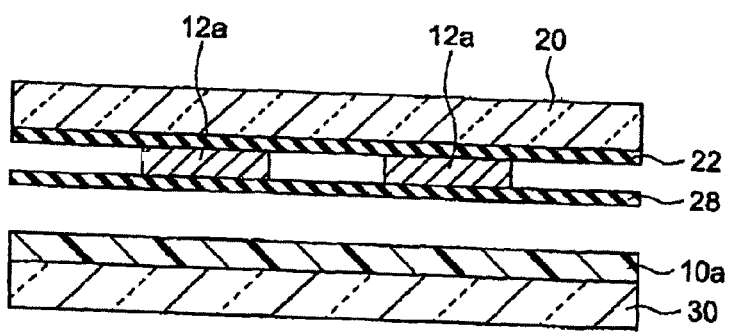
(B)
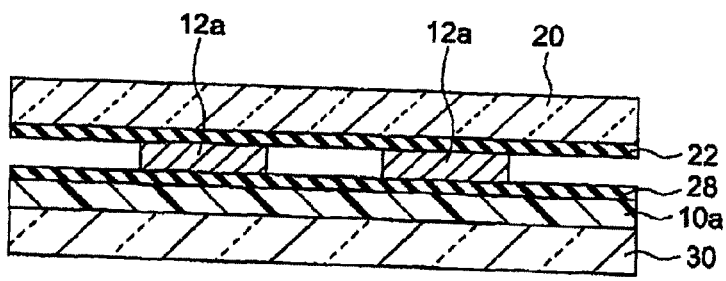
(C)
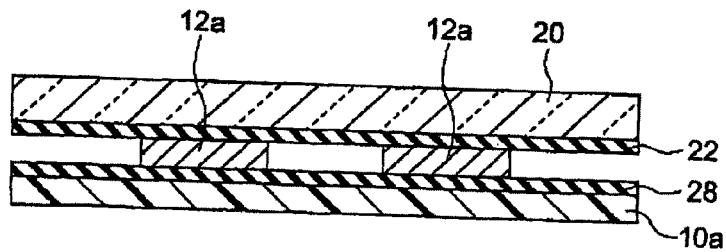

FIG. 6  Pt coated powder TEM-EDS results

_US 8,075,949 B2_

METHOD OF PRODUCTION OF A CONDUCTIVE PARTICLE, CONDUCTIVE PASTE, AND METHOD OF PRODUCTION OF ELECTRONIC DEVICE

TECHNICAL FIELD

The present invention relates to method of production of conductive particles, a conductive paste, and a method of production of an electronic device.

BACKGROUND ART

A multilayer ceramic capacitor, one example of an electronic device, is comprised of a multilayer structure device body including pluralities of dielectric layers and internal electrode layers alternately stacked and a pair of external terminal electrodes formed on the two ends of the device body.

This multilayer ceramic capacitor is produced by first alternately stacking exactly the required number of pre-firing dielectric layers and pre-firing internal electrode layers to produce a pre-firing device body, then firing this, then forming a pair of external terminal electrodes on the two ends of the fired device body.

As the pre-firing dielectric layers, ceramic green sheets are used, while as the pre-firing internal electrode layers, internal electrode paste layers of predetermined patterns, metal thin films, etc. are used.

Ceramic green sheets can be produced by the sheet method, the drawing method, etc. The "sheet method" is the method of coating a dielectric coating containing a dielectric powder, a binder, a plasticizer, an organic solvent, etc. by the doctor blade method etc. on a PET or other carrier sheet then drying it by heating. The "drawing method" is the method of biaxially drawing a film shaped body obtained by extruding a dielectric suspension comprised of a dielectric powder and a binder mixed in a solvent.

Internal electrode paste layers of predetermined patterns are produced by printing method. The "printing method" is the method of coating a conductive coating containing a conductive material including Pd, Ag—Pd, Ni, or another metal, a binder, an organic solvent, etc. on a ceramic green sheet in a predetermined pattern. Metal thin films of predetermined patterns are produced by sputtering or another thin film method.

In this way, when producing a multilayer ceramic capacitor, the pre-firing dielectric layers and pre-firing internal electrode layers are simultaneously fired. For this reason, it is required that the conductive material contained in the pre-firing internal electrode layers have a higher melting point than the sintering temperature of the dielectric powder contained in the pre-firing dielectric layers, not react with the dielectric powder, and not disperse in the dielectric layers after firing.

In the past, to satisfy these demands, Pt, Pd, and other precious metals have been used for the conductive material contained in the pre-firing internal electrode layers. However, precious metals are themselves expensive. As a result, there was the defect that the finally obtained multilayer ceramic capacitors became high in cost. Therefore, in the past, it has been widely known to lower the sintering temperature of the dielectric powder to 900 to 1100° C. and use an Ag—Pd alloy for the conductive material contained in the pre-firing internal electrode layers or to use Ni or another inexpensive base metal.

However, in recent years, the reduction in size of various types of electronic equipment has led to demand for smaller in size and larger capacity multilayer ceramic capacitors for assembly into electronic equipment. To further reduce the size and increase the capacity of multilayer ceramic capacitors, it is required to stack not only dielectric layers, but also internal electrode layers thinner and with fewer defects.

However, illustrating the case of use of Ni for the conductive material included in the pre-firing internal electrode layers, this Ni has a lower melting point than the dielectric powder included in the pre-firing-dielectric layers. For this reason, when simultaneously firing these, a large difference occurred between the sintering temperatures of the two. If sintering at the higher temperature when there is a large difference in the sintering temperatures, the internal electrode layers will crack or peel off, while if sintering at the lower temperature, firing defects of the dielectric powder will sometimes occur.

Further, if reducing the thickness of the pre-firing internal electrode layers, during the firing in a reducing atmosphere, the Ni particles included in the conductive material grow and become spheroidal. The adjoining Ni particles which had been connected before firing become separated resulting in voids at all different locations. As a result, it becomes difficult to continuously form fired internal electrode layers. When the fired internal electrode layers are not continuous, there is the problem that the multilayer ceramic capacitor falls in electrostatic capacity.

However, the following Patent Document 1 shows the method of alloying the internal electrode layers so as to prevent disconnection of the internal electrodes. However, this Patent Document 1 considers control of the alloy difficult with the thin film formation method, prepares internal electrode layers made of multilayer metal films before firing, and alloys them in the firing stage.

However, this Patent Document 1 does not disclose anything regarding what kind of metal may be used to alloy with so as to suppress growth of nickel particles in the firing stage and prevent spheroidization so as to prevent electrode disconnection when using internal electrodes having nickel as their main ingredients. Depending on the composition forming the multilayer metal films, conversely the sintering temperature ends up being lowered and growth of the nickel particles in the firing stage cannot be suppressed.

Further, when the metal film contacting a ceramic when forming a multilayer metal film is poor in wettability and bondability with the ceramic, conversely spheroidization and disconnection end up occurring and the capacitor falls in electrostatic capacity.

Further, the following Patent Document 2 proposes a conductive paste having nickel as a main ingredient and containing a metallocene expressed by a general formula $M[(C_5H_5)_2]$ (M is at least one kind of Ru, Os, Pd, Cr, and Co).

However, in this Patent Document 2, the conductive paste only contains the nickel particles and metallocene separately dispersed and does not cover the nickel particles with precious metal particles.

For this reason, the effect of suppression of grain growth of the nickel particles at the firing stage was weak, the effect of preventing spheroidization was weak, and a method able to effectively prevent electrode disconnection has been sought.

Therefore, the applicant filed a patent application shown in the following Patent Document 3 to solve these problems. This patent application discloses conductive particles obtained by sputtering to form a thin film of an alloy of Ni and a precious metal and pulverizing this thin film to obtain an alloy powder for use for forming internal electrode layers and conductive particles comprised of nickel particles coated with a platinum layer. By using such conductive particles, the applicant discovered that it is possible to provide a multilayer ceramic capacitor or other electronic device able to suppress growth of the Ni particles in the firing stage, effectively prevent spheroidization and electrode disconnection, and effectively suppress a drop in electrostatic capacity even when the internal electrode layers are reduced in thickness.

However, to produce the above conductive particles, in the case of alloy particles, there was the problem that the steps were increased such as by the sputtering and the production process became longer. Further, in the case of coated particles, when depositing platinum around the nickel particles, segregated particles of platinum of several μm or more were produced and the nickel particles were sometimes not coated by platinum. Therefore, there was the problem of a poor efficiency of production of platinum-coated nickel particles.

Note that as shown in Patent Document 4, the method of production of conductive particles of forming a nickel or other base metal coating layers on the surfaces of the particles of palladium or other precious metal powder is known. However, with the art disclosed in this publication, the precious metal particles have a distribution of size of 0.3 to 0.5 μm. The particle size is too large for internal electrode layers reduced in thickness, so finer sized particles have been sought. Further, in the invention shown in this Patent Document 4, since Ni or another base metal is used for the outside coating layers, when making Ni deposite on the surfaces of the cores of Pt particles during the reduction deposition step, the Ni coatings sometimes are oxidized to form Ni oxides when the coatings are too thin. Therefore, there were limits with the art described in Patent Document 4 when trying to use an easily oxidizable substance such as Ni as the main metal material of the internal electrodes.

Patent Document 1: Japanese Patent Publication (A) No. 3-126206

Patent Document 2: Japanese Patent Publication (A) No. 10-214520

Patent Document 3: International Publication No. WO04/070748

Patent Document 4: Japanese Patent Publication (A) No. 8-212827

DISCLOSURE OF THE INVENTION

Problems to be Solved by the Invention

The present invention was made in consideration of this situation and has as its object to provide a method of production of conductive particles able to suppress growth of the conductive particles in the firing stage, effectively prevent spheroidization and electrode disconnection, and effectively suppress a drop in electrostatic capacity even when the internal electrode layers are reduced in thickness and able to efficiently produce cores covered by thin coating layers without abnormal segregation of the coating layer metal (for example to several μm or more). Further, an object of the present invention is to provide a conductive paste obtained by using conductive particles obtained by the above method of production and a method of production of a multilayer ceramic capacitor or other electronic device produced using that conductive paste.

Means for Solving the Problems

To achieve the above object, the method of production of a conductive particle according to a first aspect of the present invention is a method of production of a conductive particle comprising a core having nickel as its main ingredient and a coating layer covering the core said method of production of conductive particles having a dispersion preparation step of preparing an aqueous dispersion containing a core powder for forming said core, a water-soluble metal salt including a metal or alloy for forming the coating layer, and a surfactant, and a reduction deposition step of mixing the aqueous dispersion and a reducing agent to cause a metal or alloy for forming the coating layer to be deposited by reduction on the outer surfaces of the core powder, the metal or alloy for forming the coating layer being comprised of a metal or alloy having at least one type of elements selected from ruthenium (Ru), rhodium (Rh), rhenium (Re), and platinum (Pt) as a main ingredient.

In the first aspect of the present invention, the surfactant is not particularly limited, but is preferably a non-ionic surfactant and the hydrophilic lipophilic balance (HLB) value is preferably 8 to 20. A non-ionic surfactant is preferable since it does not contain any metal ingredient forming an impurity. Further, the HLB value is preferably 8 to 20 because an aqueous solution is used as the solvent, so selection of a hydrophilic surfactant is preferable.

Further, in the first aspect of the present invention, the surfactant is preferably contained in an amount of 0.001 to 1 part by weight with respect to 100 parts by weight of water in the aqueous dispersion. If the content of the surfactant is too small, in the reduction deposition step, the metal or alloy for forming the coating layer will not form coating layer and abnormal segregation (segregated particles of several μm or more) will tend to end up occurring. Further, if the content of the surfactant is too large, deposition of the coating layer metal or alloy on the outer surface of the core powder tends to become difficult.

To achieve the above object, the method of production of a conductive particle according to the second aspect of the present invention is a method of production of a conductive particle comprising core having nickel as its main ingredient and coating layer covering around the core, a dispersion preparation step of preparing an aqueous dispersion containing a core powder for forming said core, a water-soluble metal salt including a metal or alloy for forming the coating layer, and a water-soluble polymer compound, and a reduction deposition step of mixing said aqueous dispersion and a reducing agent to cause a metal or alloy for forming the coating layer to be deposited by reduction on the outer surface of the core powder, the metal or alloy for forming the coating layers being comprised of a metal or alloy having at least one type of elements selected from ruthenium (Ru), rhodium (Rh), rhenium (Re), and platinum (Pt) as a main ingredient.

In the second aspect of the present invention, the water-soluble polymer compound is not particularly limited, but preferably is any of at least an acrylic acid ester polymer, a methacrylic acid ester polymer, or a copolymer of acrylic acid ester and methacrylic acid ester. The molecular weight of the polymer is 50,000 to 200,000 and the acid value is preferably 3 mgKOH/g to 20 mgKOH/g. If in this range, the dispersion ability of the precious metal particles for the coating layers is improved and segregation of precious metal particles for the coating layer can be effectively suppressed. Note that if the molecule weight is smaller than the above, the dispersion becomes poor, while if larger, the aqueous solution increases in viscosity and handling becomes difficult and, further, deposition on the core Ni particle tends to become difficult. If the acid value is smaller than the above range, the dispersion becomes poor, while conversely if larger, deposition on the Ni particle tends to become difficult.

In the second aspect of the present invention, the water-soluble polymer compound is particularly preferably polyvinyl alcohol (PVA). In the case of PVA, partially saponified PVA with a saponification degree of 87 to 89 mol % is preferable. If using FVA with a saponification degree in this range, the solubility in water is improved. Further, since the dispersability is improved, the Pt particles produced become finer, the Pt coating layer formed on the surface of the Ni particle became continuous, and good coated powder is obtained. Further, to improve the dispersability, a PVA with a block structure at the above range of saponification degree is preferable. By making this a block structure, the surface activity becomes greater, the surface tension falls, and the emulsifying power becomes greater. That is, the dispersion ability is improved more.

In the second aspect of the present invention, the water-soluble polymer compound is included in preferably 0.001 to 1 part by weight with respect to 100 parts by weight of water in the aqueous dispersion. If the content of the water-soluble polymer compound is too small, in the reduction deposition step, the metal or alloy for forming the coating layer tends to end up abnormally segregating (segregated particles of a size of several μm) without forming coating layer. Further, if the content of the water-soluble polymer compound is too large, deposition of the coating layer metal or alloy on the outer surface of the core powder tends to become difficult.

In the method of production of the present invention, the coating layer preferably covers the entire circumference of the outer surface of the core without gaps, but it is also possible to make the metal or alloy for forming the coating layer deposite by reduction on the outer surface of the core powder so that the coating layer covers part of the outer surface of the core rather than covers the entire circumference. That is, the coating layer deposited by reduction are ideally continuous film formed uniformly coating the entire surface of one particle of the core having Ni as its main ingredient, but there is an effect of suppressing spheroidization or disconnection even when several to several hundred specific precious metal particles having a size of 15 nm or less (for example, Pt particles) are deposited on the core Ni powder surfaces.

Preferably, the metal or alloy for forming the coating layer is deposited by reduction on the outer surface of the core powder so that when a representative length of the core is d0 and the thickness of the coating layer is to, 0<t0/d0≦0.15, more preferably 0<t0/d0≦0.08.

The core powder is a spherical, flake, projection, and/or amorphous shape powder with a representative length of preferably 10 to 200 nm in range, particularly preferably 10 to 100 nm. Note that the "representative length" of the particles (The core powder) means the diameter in the case where the particles are spheroidal and the maximum length of the shape of the particles when other shapes.

Preferably, the coating layer have a thickness of 1 to 15 nm in range, more preferably 1 to 10 nm in range, particularly preferably 1 to 8 nm in range. If the coating layer is too thin, the present invention tends to become smaller in action and effect. Further, if the coating layer is too thick, the representative length of the conductive particles is made smaller, so the relative amount of nickel becomes smaller and there is less meaning in use of nickel particle as the core of the conductive particle.

Preferably, the core powder is heat-treated with a heat treatment temperature of 200 to 400° C. and an oxygen partial pressure of $10^{-23}$ Pa or less after depositing by reduction the metal or alloy for forming the coating layers on the surface of the core powder. By heat treatment under such conditions, it is possible to produce conductive particles of the present invention efficiently without causing abnormal segregation. Note that heat treatment enables the bonding strength of the coating layer with the core to be enhanced. This has also been experimentally confirmed.

Preferably, the dispersion preparation step and the reduction deposition step are performed in an atmosphere of an oxygen content of 0.01 vol % or less. If the content of oxygen in the atmosphere is too large, the surfaces of the core powder comprised of the Ni particles etc. tend to be oxidized and the bondability between the Pt or other specific deposited precious metal particles and core powder tends to end up falling.

Preferably, the content of the water-soluble metal salt in the aqueous dispersion is 0.01 to 1 part by weight with respect to 100 parts by weight of water. If this content is too small, there is less abnormal segregation of the coating layer metal or alloy, but the efficiency of recovery of the conductive particles on which the coating layers are formed tends to become poorer despite the use of a large amount of water. Further, if the content is too large, abnormal segregation of the coating layer metal or alloy (segregated particles of several μm or more) tends to occur more easily.

Preferably, the water-soluble metal salt is any of at least platinum chloride, rhodium chloride, rhenium pentachloride, rhenium trichloride, and ruthenium chloride, particularly preferably is platinum chloride.

The content of the reducing agent in the aqueous dispersion is 0.1 to 10 parts by weight with respect to 100 parts by weight of water. By the treatment under these conditions, it is possible to efficiently produce the conductive particles of the present invention without causing abnormal segregation.

Preferably, the reducing agent is any of at least hydrazine, hypophosphorous acid, and formic acid, particularly preferably is hydrazine.

In the present invention, the metal or alloy for forming the coating layers is made to deposit by reduction on the outer surfaces of the core powder so that the content of nickel in the finally obtained conductive particles is preferably 87 mol % to less than 100 mol %, more preferably 97 mol % to less than 100 mol %, while the content of the metal or alloy forming the coating layers is preferably larger than 0 to 13 mol % or less, more preferably larger than 0 to 3 mol % or less.

The conductive paste according to the present invention is a conductive paste containing conductive particles obtained by any of the above methods of production of conductive particles.

Further, the method of production of an electronic device according to the present invention is a method of production of an electronic device having an internal electrode layer and a dielectric layer, comprising steps of:

producing a green sheet forming the dielectric layer after firing, using the conductive paste described above to form an electrode paste forming the internal electrode layer on the surface of the green sheet, stacking the green sheet on which the electrode paste layer have been formed so as to form a stack, and firing the stack.

In the present invention, preferably the dielectric layer are made of a dielectric material able to be fired in a reducing atmosphere. The internal electrode layer has nickel as its main ingredient, so to prevent oxidation at the time of simultaneous firing, the dielectric layer is preferably made of a dielectric material able to be fired in a reducing atmosphere.

Note that the material, method of production, etc. of the green sheet able to be used in the present invention are not particularly limited, but the sheets may be ceramic green sheet formed by the doctor blade method, porous ceramic green sheet obtained by biaxial drawing of extruded film, etc.

Further, in the present invention, the electronic device is not particularly limited, but a multilayer ceramic capacitor, piezoelectric device, chip inductor, chip varistor, chip thermistor, chip resistor, or other surface mounted (SMD) chip type electronic device may be illustrated.

EFFECTS OF THE INVENTION

Ru, Rh, Re, and Pt are precious metals with melting points higher than Ni. Further, coating layers having these metals or alloys as main ingredients are superior in wettability and bondability with the dielectric layers. Therefore, by using conductive particles having cores having Ni as their main ingredients on which these coating layers are formed so as to form internal electrode layers, even if the internal electrode layers are made thinner, it is possible to suppress the growth of Ni particles in the firing stage and effectively prevent spheroidization, electrode disconnection, etc. and effectively suppress reduction of the electrostatic capacity. Further, delamination between the internal electrode layers and dielectric layers can also be prevented. Further, no firing defects of the dielectric powder will occur.

Further, according to the method of production of the present invention, it is possible to produce conductive particles optimm as conductive particles to be included in electrode paste for forming the internal electrode layers of an electronic device having internal electrode layers and dielectric layers with a high efficiency without the occurrence of abnormal segregation (segregated particles of a size of several μm). That is, according to the method of production of the present invention, it is possible to prevent the formation of segregated particles of a precious metal (for example, Pt) of a size of several μm and form good Pt or other coating layers on the surfaces of the Ni particles or other core powder of 200 nm size or less.

In the present invention, the water-soluble polymer compound or surfactant is believed to act so that when the precious metal (for example Pt) particles are formed by the addition of the reducing agent, the polymer compound molecules or surfactant molecules are adsorbed on the surfaces of the precious metal particles and prevent direct contact between precious metal particles or suppress agglomeration or segregation to a size of several μm.

BRIEF DESCRIPTION OF THE DRAWINGS

FIG. 2 is a schematic cross-sectional view of a conductive particle according to an embodiment of the present invention.

FIG. 4(A) to FIG. 4(C) are cross-sectional views of principal parts showing a method of transfer of an internal electrode layer film.

FIG. 5(A) to FIG. 5(C) are cross-sectional views of principal parts showing steps after FIG. 4(C).

BEST MODE FOR CARRYING OUT THE INVENTION

Figure 1:
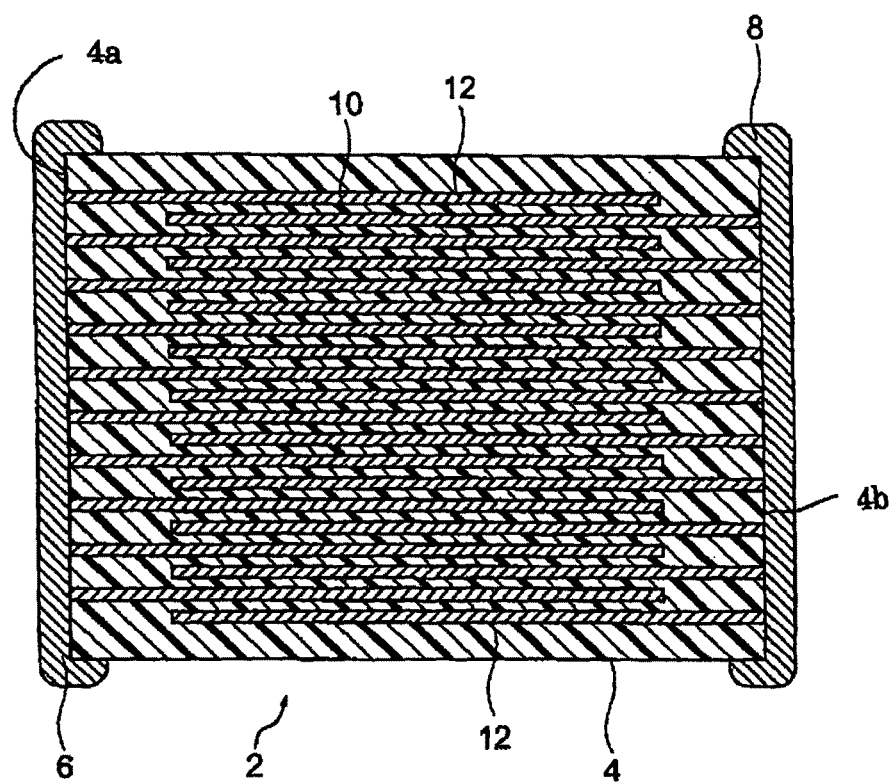
FIG. 1 is a schematic cross-sectional view of a multilayer ceramic capacitor according to an embodiment of the present invention.

Below, the present invention will be explained based on embodiments shown in the drawings.

First, the overall configuration of a multilayer ceramic capacitor will be explained as one embodiment of an electronic device according to the present invention.

As shown in FIG. 1, the multilayer ceramic capacitor 2 according to the present embodiment has a capacitor body 4, first terminal electrode 6, and second terminal electrode 8. The capacitor body 4 has dielectric layers 10 and internal-electrode layers 12. These internal electrode layers 12 are alternately stacked between the dielectric layers 10. Every other of the stacked internal electrode layers 12 are electrically connected to the inside of the first terminal electrode 6 formed at the outside of the first end 4a of the capacitor body 4. Further, the other stacked internal electrode layers 12 are electrically connected to the inside of the second terminal electrode 8 formed at the second end 4b of the capacitor body 4.

Figure 3:
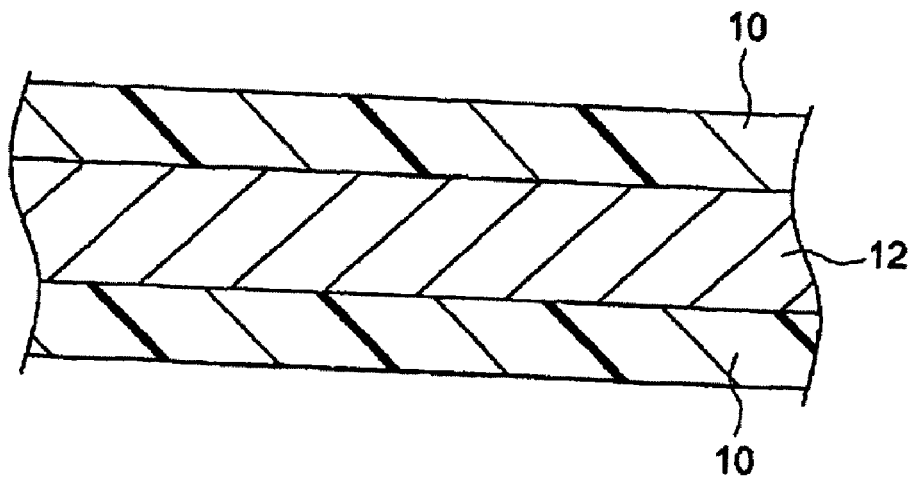
FIG. 3 is a cross-sectional view of principal parts of an internal electrode layer shown in FIG. 1.

In the present embodiment, the internal electrode layers shown in FIG. 1 and FIG. 3 have a core metal (including alloys) including nickel and a coating layer metal (including alloys) including at least one type of element selected from ruthenium (Ru), rhodium (Rh), rhenium (Re), and platinum (Pt). In the internal electrode layers 12, the core metal and the coating layer metal are present in the form of an alloy. Alternatively, in the internal electrode layers 12, the core metal and the coating layer metal may be present in a form not forming an alloy.

The core metal is comprised of a metal having nickel as its main ingredient or an alloy with another metal having nickel as its main ingredient. The ratio of the nickel in the core metal is preferably 99 to 100 wt %, more preferably 99.5 to 100 wt %, with respect to the core metal as 100 wt %. If the ratio of the nickel of the main ingredient is too small, the core metal is easily oxidizeed at the time of firing and electrode disconnection, a drop in electrostatic capacity, diffusion of the metal ingredient to the dielectric layers, or other problems tend to become more frequent.

Note that as the metal serving as a sub ingredient able to form an alloy with the nickel in the core metal, for example, Ta, Mo, Zr, Cu, Co, Fe, Nb, W, etc. may be mentioned.

The coating layer metal is comprised of a metal or alloy having at least one type of precious metal element selected from ruthenium (Ru), rhodium (Rh), rhenium (Re), and platinum (Pt) as a main ingredient. The ratio of these elements contained as the main ingredient is preferably 99 to 100 wt %, more preferably 99.5 to 100 wt %, with respect to the entire coating layer metal as 100 wt %. If the ratio of the precious metal element as the main ingredient is too small, the effect of suppressing growth of the Ni particles in the core metal at the firing stage tends to become smaller. As the metal ingredients (impurities) which may be contained other than the main ingredient in the coating layer metal, Cu, Co, Fe, Ta, Nb, W, Zr, Au, Pd, etc. may be mentioned.

Note that the core metal and/or coating layer metal may contain S, C, P, and other various trace amount ingredients in amounts of 0.1 mol % or so or less. Further, the ratio of the core metal and coating layer metal in the internal electrode layers 12 is equal to the ratio of the core metal forming the cores 51 in the conductive particles 50 shown in the later explained FIG. 2(A) or FIG. 2(B) and the coating layer metal forming the coating layers 52.

The internal electrode layers 12 shown in FIG. 1 and FIG. 3, as will be explained in detail later, are formed using conductive paste containing the conductive particles 50 shown in FIG. 2(A) and FIG. 2(B). As shown in FIG. 4 to FIG. 5, they are formed by transferring an internal electrode layer film 12a on to a ceramic green sheet 10a. The internal electrode layers 12 are thicker than the internal electrode layer film 12a by exactly the amount of shrinkage in the horizontal direction due to firing.

The dielectric layers 10 are not particularly limited in material, but for example are comprised of calcium titanate, strontium titanate, and/or barium titanate or another dielectric material. The dielectric layers 10 are preferably comprised of a dielectric material able to be fired in a reducing-atmosphere.

The dielectric layers 10 are not particularly limited in thickness, but ones of several μm to several hundred μm are general. In particular, in the present embodiment, they are preferably reduced in thickness to 5 μm or less, more preferably to 3 μm or less.

The terminal electrodes 6 and 8 are not particularly limited in material, but usually copper or a copper alloy, nickel or nickel alloy, etc. may be used, but silver or an alloy of silver and palladium may be used. The terminal electrodes 6 and 8 are not particularly limited in thickness, but are usually 10 to 50 μm or so.

The shape and size of the multilayer ceramic capacitor 2 may be suitably determined in accordance with the object or application. When the multilayer ceramic capacitor 2 is a rectangular parallelepiped, it is usually a length of 0.6 to 5.6 mm, preferably 0.6 to 3.2 mm, a width of 0.3 to 5.0 mm, preferably 0.3 to 1.6 mm, and a thickness of 0.1 to 1.9 mm, preferably 0.3 to 1.6 mm or so.

Next, one example of the method of production of a multilayer ceramic capacitor 2 will be explained. First, a dielectric paste is prepared for producing the ceramic green sheets for forming the dielectric layers 10 shown in FIG. 1 after firing. The dielectric paste is usually comprised of an organic solvent-based paste or water-based paste obtained by kneading a dielectric material and an organic vehicle.

As the dielectric material, composite oxides, oxides, and other various types of compounds, for example, carbonates, nitrates, hydroxides, organic metal compounds, etc. may be suitably selected from and mixed for use. The dielectric material is usually used as a powder with an average particle size of 0.1 to 3.0 μm or so. Note that to form an extremely thin green sheet, it is preferable to use a powder finer than the thickness of the green sheet.

The organic vehicle is comprised of the binder dissolved in an organic solvent. The binder used for the organic vehicle is not particularly limited. Ethyl cellulose, polyvinyl butyral, acrylic resin, or various other binders may be used, but preferably polyvinyl butyral or another butyral-based resin may be used.

Further, the organic solvent used for the organic vehicle is not particularly limited, but terpineol, butyl carbitol, acetone, toluene, or other organic solvent may be used. Further, the vehicle in the water-based paste is comprised of water in which a water-soluble binder is dissolved. The water-soluble binder is not particularly limited, but polyvinyl alcohol, methyl cellulose, hydroxyethyl cellulose, water-soluble acrylic resin, an emulsion, etc. may be used. The contents of the ingredients in the dielectric paste are not particularly limited, but the usual contents are for example a binder of 1 to 5 wt % or so and a solvent (or water) of 10 to 50 wt % or so.

The dielectric paste may contain, in accordance with need, various types of additives selected from dispersants, plasticizers, dielectrics, glass frit, insulators, etc. However, their total content is preferably 10 wt % or less. When using a butyral-based resin as the binder resin, the plasticizer is preferably contained in an amount of 25 to 100 parts by weight with respect to 100 parts by weight of the binder resin. If the amount of plasticizer is too small, the green sheet tends to became brittle, while if too large, the plasticizer bleeds out and handling is difficult.

Next, the above dielectric paste is used by the doctor blade method, as shown in FIG. 5(A), to form a green sheet 10a on a second support sheet comprised of the carrier sheet 30 to preferably 0.5 to 30 μm, more preferably 0.5 to 10 μm or so thickness. The green sheet 10a is dried after being formed on the carrier sheet 30. The drying temperature of the green sheet 10a is preferably 50 to 100° C., while the drying time is preferably 1 to 5 minutes.

Next, separate from the carrier sheet 30, as shown in FIG. 4(A), a carrier sheet 20 is prepared as a first support sheet. A release layer 22 is formed on this. Next, the surface of the release layer 22 is formed with an internal electrode layer film 12a for forming the internal electrode layers 12 after firing in a predetermined pattern.

The internal electrode layer film 12a is formed by a conductive paste having the conductive particles 50 shown in FIG. 2(A) and FIG. 2(B). The thickness t1 of the internal electrode layer film 12a formed (see FIG. 4) is preferably 0.1 to 1 μm, more preferably 0.1 to 0.5 μm or so. Note that the thickness t2 of the release layer 22 is a thickness of 60% or less of the thickness t1 of the internal electrode layer film 12a.

The internal electrode layer film 12a is for example formed by printing. As the printing method, for example, screen printing etc. may be mentioned. When using screen printing, one type of printing method, to form an internal electrode layer conductive paste film as the internal electrode layer film 12a on the surface of the release layer 22, the following procedure is followed.

First, the conductive particles 50 shown in FIG. 2(A) for forming the film 12a are prepared. The conductive particles 50 have cores 51 having nickel as their main ingredient and coating layers 52 covering the cores 51. The cores 51 are not particularly limited in shape and may be spheroidal, flake-shaped, projection-shaped, and/or amorphous shape. In the present embodiment, the spherical shape will be explained. The coating layers 52 covering the cores 51 need not cover the entire outer circumferences of the cores 51 and may also coat parts of the outer circumferences of the cores 51 as shown in FIG. 2(B).

The diameter d0 of the cores 51 is preferably 10 to 200 nm, more preferably 10 to 100 nm in range. Further, the thickness t0 of the coating layers 52 is preferably 1 to 15 nm in range, more preferably 1 to 10 nm in range, particularly preferably 1 to 8 nm in range. Further, a relation of $0<t0/d0\leqq0.15$ (15%) is preferable, while a relation of $0<t0/d0\leqq0.08$ (8%) is more preferable.

If the coating layers 52 are too thin, the action and effect of the present invention tend to become smaller. Further, if the coating layers 52 is too thick, since the size (d0+2*t0) of the conductive particles 50 is reduced, the amount of nickel forming the cores 51 becomes relatively smaller and there is less meaning in use of nickel particles as the cores of the conductive particles.

The cores 51 are comprised of a metal having nickel as its main ingredient or an alloy with another metal having nickel as its main ingredient. The ratio of the nickel in the cores 51 is preferably 99 to 100 wt %, more preferably 99.5 to 100 wt %, with respect to the cores 51 as 100 wt %. Note that as the metal as the sub ingredient able to form an alloy with nickel in the cores 51, for example Ta, Mo, Zr, Cu, Co, Fe, Nb, W, etc. may be mentioned.

The coating layers 52 are comprised of a metal or alloy having at least one type of precious metal element selected from ruthenium (Ru), rhodium (Rh), rhenium (Re) and platinum (Pt) as a main ingredient. The ratio of these elements included as the main ingredient is preferably 99 to 100 wt %, more preferably 99.5 to 100 wt %, with respect to the entire coating layers 52 as 100 wt %. As the metal ingredient (impurity) which may be included in addition to the main ingredient in the coating layers 52, Cu, Co, Fe, Ta, Nb, W, Zr, Au, Pd, etc. may be mentioned.

Conductive particles 50 having cores 51 coated by coating layers 52 in this way are produced as follows in the present embodiment. First, an aqueous solution containing an Ni powder or other core powder and a water-soluble metal salt (Pt chloride etc.) including a metal or alloy for forming the coating layers and an aqueous dispersion containing a water-soluble polymer compound or surfactant are prepared.

That is, the Pt chloride or other water-soluble metal salt is dissolved in water, then a water-soluble polymer compound or surfactant is added and uniformly dispersed to prepare an aqueous solution. Next, Ni powder or another core powder is charged into the aqueous solution and vigorously stirred to cause it to uniformly disperse.

Note that as the atmosphere for preparing these, handling in a glove box with an $N_2$ flow is preferable. The oxygen content is preferably 0.01 vol % or less. If the content of oxygen in the atmosphere is too large, the surface of the core powder comprised of the Ni particles etc. are oxidized and the bondability between the Pt or other specific precious metal deposited particles and the core powder tends to end up deteriorating.

Next, a reducing agent is added to the aqueous solution of Pt chloride containing the thus prepared Ni powder or other core powder and water-soluble polymer compound or surfactant so as to cause the Pt to deposite by reduction on the surfaces of the particles of the Ni powder. At this time, as the reducing agent, hydrazine hydrate is preferable. The hydrazine hydrate is preferably added lowered in concentration by adding water. Specifically, hydrazine hydrate 80% is used and diluted by water to 0.1 wt %. If the hydrazine concentration is greater than the above range, Pt segregation of several 10 μm or more occurs and the presence of Ni powder not coated by Pt is observed. Further, if the concentration is too low, Pt segregation is reliably eliminated, but the efficiency of recovery of Pt coated Ni powder becomes poorer despite the use of a large amount of water.

The hydrazine is added while vigorously stirring the aqueous solution. The amount of addition of the hydrazine hydrate can be determined considering the amount of Pt chloride. After the reduction deposition reaction ends, the Pt coated Ni powder is repeatedly rinsed several times, then dried at 100° C. in an $N_2$ flow, then the coating powder is heat treated at 200 to 400° C. in $N_2$ at an oxygen partial pressure of $10^{-23}$ Pa or less. Note that if less than 200° C., the bondability between the Pt coating and the Ni particles tends to become worse, while conversely if larger than 400° C., the Ni starts to sinter and grow in size whereby coarse particles are produced. Further, if the oxygen partial pressure is larger than $10^{-23}$ Pa, the Ni tends to end up oxidizing.

The thus obtained conductive particles 50 may be kneaded with an organic vehicle to form a paste and obtain a conductive paste for forming a film 12a. The organic vehicle used may be one similar to the case of the above dielectric paste.

The obtained conductive paste is formed in a predetermined pattern on the surface of the release layer 22 by for example screen printing as shown in FIG. 4 so as to obtain an internal electrode layer film 12a of a predetermined pattern.

Next, separate from the carrier sheets 20 and 30, as shown in FIG. 4(A), an adhesive layer transfer sheet comprised of a carrier sheet 26 serving as a third support sheet on the surface of which an adhesive layer 28 is formed is prepared. The carrier sheet 26 is configured by same sheets as with the carrier sheets 20 and 30.

To form an adhesive layer on the surface of the internal electrode layer film 12a shown in FIG. 4(A), in the present embodiment, the transfer method is employed. That is, as shown in FIG. 4(B), the adhesive layer 28 of the carrier sheet 26 is pushed against the surface of the internal electrode layer film 12a and hot pressed there, then the carrier sheet 26 is peeled off so as to transfer the adhesive layer 28 to the surface of the internal electrode layer film 12a as shown in FIG. 9(C).

The heating temperature at this time is preferably 40 to 100° C. Further, the pressing force is preferably 0.2 to 15 MPa. The pressing may be pressing by a press or pressing by a calendar roll, but use of a pair of rolls is preferable.

After this, internal electrode layer film 12a is adhered to the surface of the green sheet 10a formed on the surface of the carrier sheet 30 shown in FIG. 5(A). For this, as shown in FIG. 5(B), the internal electrode layer film 12a of the carrier sheet 20 is pushed against the surface of the green sheet 10a together with the carrier sheet 20 through the adhesive layer 28 and hot pressed, as shown in FIG. 5(C), to transfer the internal electrode layer film 12a on the surface of the green sheet 10a. However, the carrier sheet 30 at the green sheet side is peeled off, so when seen from the green sheet 10a, the green sheet 10a is transferred to the internal electrode layer film 12a through the adhesive layer 28.

The heating and pressing at the time of this transfer may be pressing and heating by a press or pressing and heating by a calendar roll, but use of a pair of rolls is preferable. The heating temperature and the pressing force are similar to those when transferring the adhesive layer 28.

By the steps shown in FIG. 4(A) to FIG. 5(C), an internal electrode layer film 12a of a predetermined pattern is formed on a single green sheet 10a. This is used to obtain a stack comprised of a plurality of alternately arranged internal electrode layer films 12a and green sheets 10a.

After this, the stack is finally pressed, then the carrier sheet 20 is peeled off. The pressure at the time of the final pressing is preferably 10 to 200 MPa. Further, the heating temperature is preferably 40 to 100° C.

After this, the stack is cut to a predetermined size to form a green chip. Further, the green chip is treated to remove the binder and fired.

When using Ni as the base material for the cores 51 of the conductive particles for forming the internal electrode layers like in the present invention, the atmosphere in the treatment for removal of the binder is preferably air or an $N_2$ atmosphere. Further, the other conditions for binder removal are a rate of temperature rise of preferably 5 to 300° C./hour, more preferably 10 to 50° C./hour, a holding temperature of preferably 200 to 400° C., more preferably 250 to 350° C., and a temperature holding time of preferably 0.5 to 20 hours, more preferably 1 to 10 hours.

In the present invention, the green chip is fired in an atmosphere of an oxygen partial pressure of preferably $10^{-10}$ to $10^{-2}$ Pa, more preferably $10^{-10}$ to $10^{-5}$ Pa. If the oxygen partial pressure at the time of firing is too low, the conductive material of the internal electrode layers becomes abnormally sintered and disconnection sometimes results. Conversely, if the oxygen partial pressure is too high, the internal electrode layers tend to be oxidized.

In the present invention, the green chip is fired at a temperature of preferably 1000° C. to less than 1300° C. If making the firing temperature less than 1000° C., the sintered dielectric layers are insufficiently densified and the electrostatic capacity tends to become insufficient. Further, if making it 1300° C. or more, the dielectric layers become excessively fired and the change in capacity over time when applying a DC field tends to become greater.

As other firing conditions, the rate of temperature rise is preferably 50 to 500° C./hour, more preferably 200 to 300° C./hour, the temperature holding time is preferably 0.5 to 8 hours, more preferably 1 to 3 hours, and the cooling rate is preferably 50 to 500° C./hour, more preferably 200 to 300° C./hour. Further, the firing atmosphere is preferably made the reducing atmosphere. As the atmosphere gas, for example, an $N_2$ and $H_2$ mixed gas is preferably used in the wet state.

In the present invention, the fired capacitor chip is preferably annealed. The annealing is treatment for reoxidizing the dielectric layers. Due to this, it is possible to remarkably prolong the accelerated life of the insulation resistance (IR) and improve the reliability.

In the present invention, the sintered capacitor chip is preferably annealed under an oxygen partial pressure higher than the reducing atmosphere at the time of firing. Specifically, this is performed under an atmosphere of an oxygen partial pressure of preferably $10^{-2}$ to 100 Pa, more preferably $10^{-2}$ to 10 Pa. If the oxygen partial pressure at the time of annealing is too low, the reoxidation of the dielectric layers 2 becomes difficult, while conversely if too high, the nickel of the internal electrode layers oxidizes and becomes insulative.

In the present invention, the holding temperature or maximum temperature at the time of annealing is preferably 1200° C. or less, more preferably 900 to 1150° C., particularly preferably 1000 to 1100° C. Further, in the present invention, the holding time at these temperatures is preferably 0.5 to 4 hours, more preferably 1 to 3 hours. If the holding temperature or maximum temperature at the time of annealing is less than the above range, the dielectric material will not sufficiently oxidize, so the insulation resistance life will tend to become shorter, while if over the above range, the Ni of the internal electrodes will oxidize and the capacity will drop. Not only that, the Ni will end up reacting with the dielectric material and the lifetime will also tend to become shorter. Note that the annealing may also be comprised of just a temperature raising process and a temperature lowering process. That is, the temperature holding time may also be made zero. In this case, the "holding temperature" is synonymous with the maximum temperature.

As the other annealing conditions, the cooling rate is preferably 50 to 500° C./hour, more preferably 100 to 300° C./hour. Further, the atmospheric gas at the time of annealing is preferably for example a wet $N_2$ gas etc.

Note that the $N_2$ gas may be wet by for example using a wetter etc. In this case, the water temperature is preferably 0 to 75° C. or so.

The treatment to remove the binder, firing, and annealing may be performed consecutively or independently. When performing these consecutively, it is preferable to perform the treatment to remove the binder, then change the atmosphere without cooling, raise the temperature to the holding temperature for the firing, perform the firing, then cool, change the atmosphere when reaching the holding temperature of the annealing, then perform the annealing. On the other hand, when performing these independently, at the time of firing, it is preferable to raise the temperature to the holding temperature of the treatment for removal of the binder in an $N_2$ gas or wet $N_2$ gas atmosphere, then change the atmosphere and continue raising the temperature. After cooling to the holding temperature at the time of annealing, it is preferable to again change to the $N_2$ gas or wet $N_2$ gas atmosphere and continue cooling. Further, at the time of annealing, it is also possible to raise the temperature to the holding temperature under an $N_2$ gas atmosphere, then perform the entire annealing process in a wet $N_2$ gas atmosphere without changing the atmosphere.

The thus obtained sintered body (device body 4) is polished at its end faces by for example barrel polishing, sand blasting, etc. and formed with terminal electrodes 6, 8 by firing the terminal electrode paste. The firing conditions of the terminal electrode paste are for example firing in a wet $N_2$ and $H_2$ mixed gas at 600 to 800° C. for 10 minutes to 1 hour or so. Further, in accordance with need, the terminal electrodes 6, 8 are plated etc. to form pad layers. Note that terminal electrode paste may be prepared in the same way as the above electrode paste.

The multilayer ceramic capacitor of the present invention produced in this way is mounted on a printed circuit board by soldering etc. and used for various electronic equipment.

In the present embodiment, it is possible to provide a multilayer ceramic capacitor 2 effectively suppressing any drop in the electrostatic capacity. The Ru, Rh, Re, and Pt are precious metals with higher melting points than the Ni. Further, coating layers 52 having these metals or alloys as a main ingredient are excellent in wettability and bondability with ceramic green sheets 10a. Therefore, by using conductive particles 50 of a Ni as a main ingredient of this coating layer 52 to form an internal electrode layer film 12a it is possible to suppress growth of the Ni particles in the firing stage, effectively prevent spheroidization, electrode disconnection, etc., and effectively suppress a drop in the electrostatic capacity. Further, delamination between the internal electrode layers 12 and dielectric layers 10 can also be prevented. Further, no firing defects of the dielectric powder will occur.

Further, according to the method of production of the present embodiment, it is possible to produce conductive particles 50 optimum for use as conductive particles to be included in electrode paste for forming the internal electrode layers 12 of a multilayer ceramic capacitor 2 having internal electrode layers 12 and dielectric layers 10 with a high efficiency without the occurrence of abnormal segregation (segregated particles of a size of several μm). That is, according to the method of production of the present embodiment, it is possible to prevent the formation of segregated particles of a precious metal (for example Pt) of a size of several μm and form a good Pt or other coating layer on the surfaces of Ni particles or other core powder of 200 nm or less.

Note that the present invention is not limited to the above embodiments and can be changed in various ways in the range of the present invention.

For example, the present invention is not limited to a multilayer ceramic capacitor and can be applied to other electronic devices.

EXAMPLES

Below, the present invention will be explained based on further detailed examples, but the present invention is not limited to these examples.

Example 1

This example was performed in a glove box with an $N_2$ flow with an oxygen content of 0.005 vol %.

1 g of Pt chloride hydrate was dissolved in 1 liter of water, then 1 g of PVA (one example of a water-soluble polymer compound) with a saponification degree of 88 mol % (0.1 wt % with respect to Pt chloride aqueous solution) was added and the mixture vigorously stirred to prepare a Pt chloride aqueous solution. Next, 13 g of an Ni powder having an average particle size of 100 nm was charged into the Pt chloride aqueous solution and the result stirred to prepare an aqueous dispersion.

Further, separate from this aqueous dispersion, 0.47 g of hydrazine hydrate 80% was added to 470 ml of water and the two mixed uniformly to prepare a hydrazine aqueous solution.

Next, the previously prepared Pt chloride aqueous solution containing Ni powder was vigorously stirred at room temperature while slowly adding a hydrazine aqueous solution at a rate of about 10 ml/min. By adding this hydrazine aqueous solution, a Ni powder having a Pt coating layer was produced. This was rinsed several times, dried in $N_2$ at a temperature of 100° C. for 12 hours, then heat treated in $N_2$ (oxygen partial pressure $10^{-23}$ Pa or less) at a temperature of 300° C., whereby 13.45 g of conductive particles were obtained.

Figure 6:
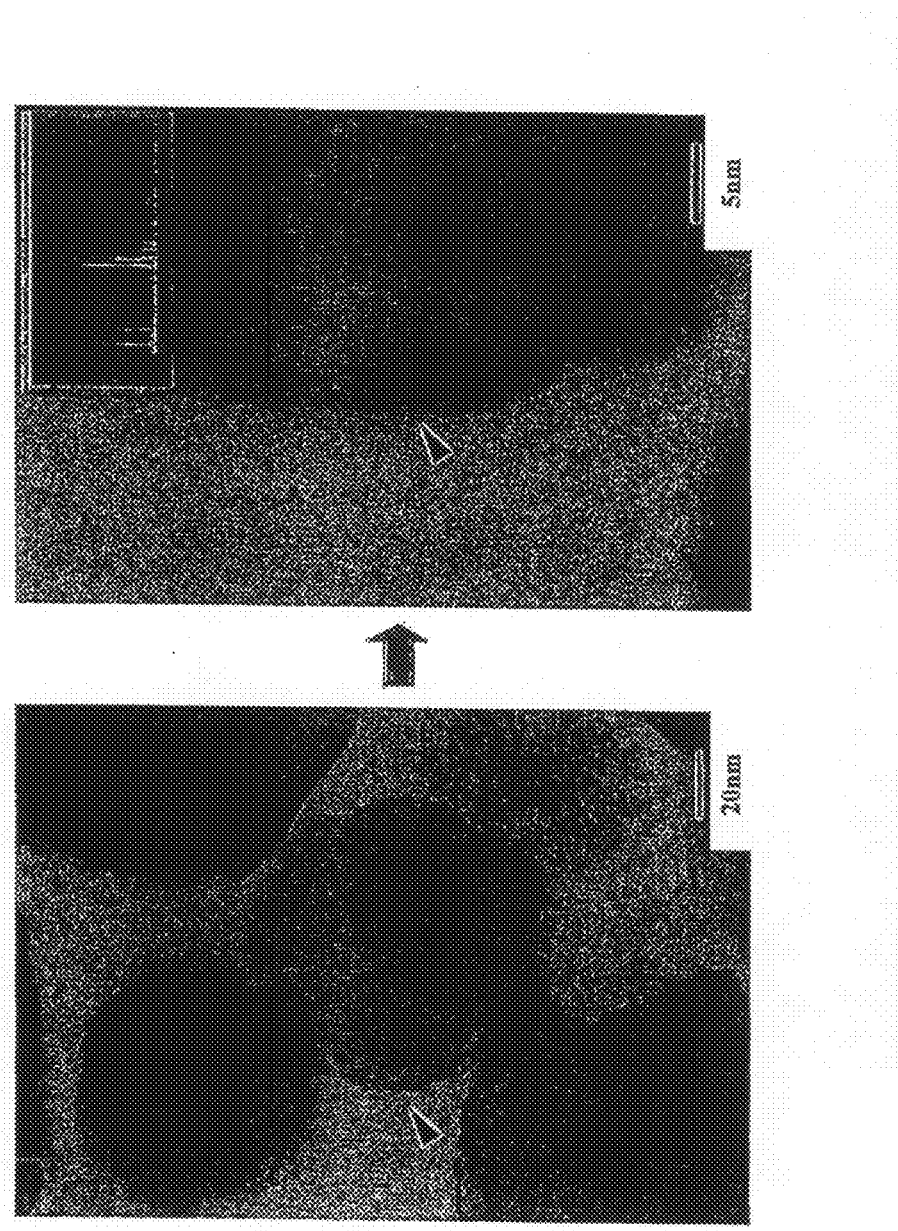
FIG. 6 is a TEM photograph of heat treated conductive particle paste in an example of the present invention.

The heat treated powder obtained in this example was examined under a scanning electron microscope, whereupon it was found there was no Pt segregation. Further, when observed under a TEM, it was confirmed that tens of Pt particles of 10 nm or less were deposited on the surfaces of the Ni particles. A TEM photograph of the heat treated conductive particles is shown in FIG. 6.

Example 2

Except for replacing the PVA with another example of a water-soluble polymer compound, that is, a copolymer of methyl acrylate and acrylic acid (acid value 10 mgKOH/g, molecular weight of 100,000), the same procedure was followed as in Example 1 to produce conductive particles. This was observed in the same way as in Example 1.

The heat treated powder obtained in this example was examined under a scanning electron microscope, whereupon it was found there was no Pt segregation. Further, when observed under a TEM, it was confirmed that tens of Pt particles of 10 nm or less were deposited on the surfaces of the Ni particles.

Example 3

Except for replacing the PVA with the use of an acetylene diol-based non-ionic surfactant (HLB value 10), the same procedure was followed as in Example 1 to produce conductive particles which were examined in the same way as in Example 1.

The heat treated powder obtained in this example was examined under a scanning electron microscope, whereupon it was found there was no Pt segregation. Further, when observed under a TEM, it was confirmed that tens of Pt particles of 10 nm or less were deposited on the surfaces of the Ni particles.

Comparative Example 1

Except for not adding PVA, the same procedure was followed as in Example 1 to produce conductive particle paste and observed it in the same way as in Example 1.

Figure 7:
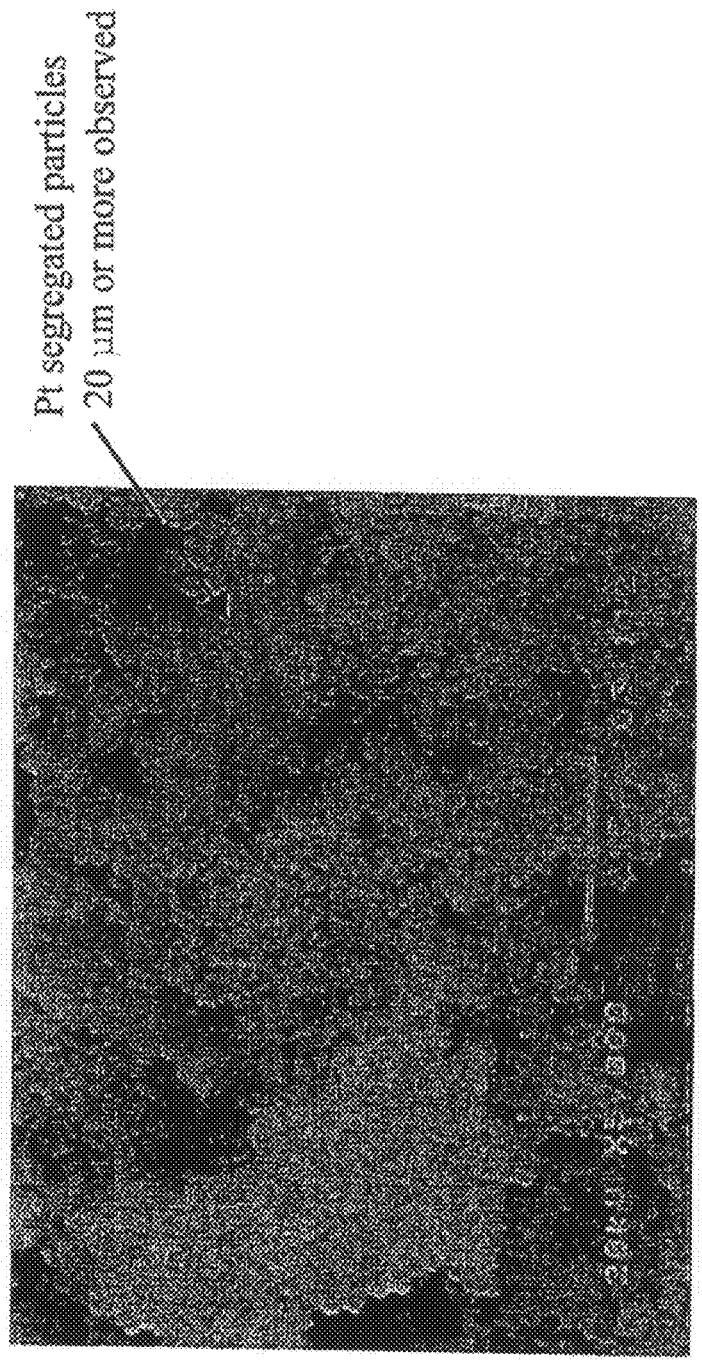
FIG. 7 is a scanning electron microscope photograph of heat treated conductive particle paste in a comparative example of the present invention.

The heat treated powder obtained by this comparative example was observed under a scanning electron microscope, whereupon segregated Pt particles of a size of several μm or more were observed. Good Pt-coated nickel particles could not be obtained. That is, in this Comparative Example 1, segregated Pt particles of a length of 20 μm or more were observed. It was confirmed that there were a large number of Ni particles not coated by Pt. A scanning electron microscope photograph of the conductive particles of this Comparative Example 1 is shown in FIG. 7.

Example 11

Fabrication of Pastes

First, a $BaTiO_3$ powder (BT-02/Sakai Chemical) and a powder selected from $MgCO_3$, $MnCO_3$, $(Ba_{0.6}Ca_{0.4})SiO_3$, and a rare earth ($Gd_2O_3$, $Tb_4O_7$, $Dy_2O_3$, $Ho_2O_3$, $Er_2O_3$, $Tm_2O_3$, $Yb_2O_3$, $Lu_2O_3$, and $Y_{2O3}$) were wet mixed by a ball mill for 16 hours and dried to obtain a dielectric material. The material powders had average particle sizes of 0.1 to 1 μm $(Ba_{0.6}Ca_{0.4})SiO_3$ was produced by wet mixing $BaCO_3$, $CaCO_3$, and $SiO_2$ by a ball mill, drying the result, firing it in the air, then wet pulverizing the result by a ball mill.

To make the obtained dielectric material into a paste, an organic vehicle was added to the dielectric material and the two were mixed by a ball mill to obtain a dielectric green sheet paste. The organic vehicle was comprised of a binder comprised of polyvinyl butyral: 6 parts by weight, a plasticizer comprised of bis (2-ethylhexyl)phthalate (DOP): 3 parts by weight, ethyl acetate: 55 parts by weight, and toluene: 10 parts by weight, and a peeling agent comprised of paraffin: 0.5 part by weight with respect to 100 parts by weight of the dielectric material.

Next, the dielectric green sheet paste was diluted two-fold by weight ratio by ethanol/toluene (55/10) to prepare a release layer paste.

Next, a dielectric green sheet paste produced in the same way except for not including dielectric particles and a peeling agent was diluted four-fold by weight ratio by toluene to prepare an adhesive layer paste.

Formation of Green Sheet

First, the dielectric green sheet paste was used to form a green sheet of a thickness of 1.0 μm on a PET film (second support sheet) using a wire bar coater.

Formation of Internal Electrode Layer Film

The above release layer paste was coated and dried on another PET film (first support sheet) by a wire bar coater to form a release layer of a thickness of 0.3 μm.

Next, the release layer was printed with conductive paste on its surface by screen printing. The conductive paste contained the conductive particles 50 shown in FIG. 2. The conductive particles 50 were produced as follows. First, as the cores 51, spherical 100% Ni powder was prepared. This Ni powder had an average particle size of 0.1 μm (100 nm).

This Ni powder was formed with coating layers 52 comprised of Pt particles by a similar method to Example 1. The conductive particles were observed under a transmission electron microscope and by crystal structure analysis. As a result, it could be confirmed that the Ni particles were covered by 5 nm of Pt from their surface parts. That is, the t0/d0 was 0.05 (5%).

The conductive particles 50 were kneaded together with an organic vehicle by the ratio shown below by a triple roll to produce a slurry for use as the internal electrode paste. That is, 100 parts by weight of the conductive particles 50 were kneaded with an organic vehicle (4.5 parts by weight of a binder resin comprised of ethyl cellulose resin dissolved in 228 parts by weight of terpineol) by a triple roll to produce a slurry for use as an internal electrode paste (conductive paste).

This internal electrode paste was used for screen printing, as shown in FIG. 4, to form an internal electrode layer film 12a of a predetermined pattern on the surface of the release layer. This film 12a had a thickness after drying of 0.5 µm.

Formation of Adhesive Layer

The above adhesive paste was coated by a wire bar coater on another PET film (third support sheet) treated on its surface for release by a silicone-based resin and dried to form an adhesive layer 28 of a thickness of 0.2µm.

Formation of Final Stack (Pre-Firing Device Body)

First, an adhesive layer 28 was transferred to the surface of an internal electrode layer film 12a by the method shown in FIG. 4. At the time of transfer, a pair of rolls were used. The pressing force was 0.1 MPa and the temperature was 80° C.

Next, the method shown in FIG. 5 was used to bond (transfer) the internal electrode layer film 12a on the surface of a green sheet 10a via the adhesive layer 28. At the time of transfer, a pair of rolls were used. The pressing force was 0.1 MPa and the temperature was 80° C.

Next, internal electrode layer films 12a and green sheets 10a were successively stacked. Finally, a final stack comprised of 21 stacked internal electrode layer films 12a was obtained. The stacking conditions were a pressing force of 50 MPa and a temperature of 120° C.

Fabrication of Sintered Body

Next, the final stack was cut to a predetermined size, then treated to remove the binder, fired, and annealed (heat treated) to prepare a chip-shaped sintered body.

The treatment to remove the binder was performed under conditions of:

Rate of temperature rise: 5 to 300° C./hour,
Holding temperature: 200 to 400° C.,
Holding time: 0.5 to 20 hours, Atmosphere gas: wet $N_2$.

The sintering was performed under conditions of:

Rate of temperature rise: 5 to 500° C./hour,
Holding temperature: 1200° C.,
Holding time: 0.5 to 8 hours,
Cooling rate: 50 to 500° C./hour,
Atmosphere gas: wet $N_2$ and $H_2$ mixed gas,
Oxygen partial pressure: $10^{-7}$ Pa.

The annealing (reoxidation) was performed under conditions of:

Rate of temperature rise: 200 to 300° C./hour,
Holding temperature: 1050° C.,
Holding time: 2 hours,
Cooling rate: 300° C./hour,
Atmosphere gas: wet $N_2$ gas,
Oxygen partial pressure: $10^{-1}$ Pa.

Note that the atmosphere gas was wet using a wetter at a water temperature of 0 to 75° C.

Next, the end faces of the chip shaped sintered body were polished by sand blasting, then external electrode paste was transferred to the end faces. This was then fired in a wet $N_2+H_2$ atmosphere at 800° C. for 10 minutes to form the external electrodes and obtain a sample of the multilayer ceramic capacitor of the configuration shown in FIG. 1.

The thus obtained sample had a size of 3.2 mm×1.6 mm×0.6 mm. There were 21 dielectric layers sandwiched between the internal electrode layers and each having a thickness of 1 µm. The internal electrode layers 12 each had a thickness of 0.5 µm. The thicknesses of the layers were measured by observation under an SEM.

The coverage rate of the electrodes was measured by cutting open a sample of the multilayer ceramic capacitor to expose the electrode surface, observing the electrode surface under an SEM, and image processing it. The electrode coverage rate was preferably 70% or more.

Further, each sample was evaluated for electrical characteristics (electrostatic capacity C, dielectric loss tang, breakdown voltage VB, and DC equivalent resistance ESR). The results are shown in Table 1. The electrical characteristics (electrostatic capacity C, dielectric loss tan δ, breakdown voltage VB, DC and equivalent resistance ESR) were evaluated as follows.

The electrostatic capacity C (unit: µF) was measured for a sample at a reference temperature of 25° C. by a digital LCR meter (YHP 4274A) under conditions of a frequency of 1 kHz and an input signal level (measurement voltage) of 1 Vrms. The electrostatic capacity C was preferably 0.9 µF or more.

The dielectric loss tanδ was measured at 25° C. by a digital LCR meter (YHP 4274A) under conditions of a frequency of 1 kHz and an input signal level (measurement voltage) of 1 Vrms. The dielectric loss tan δ was preferably less than 0.1, particularly preferably 0.05 or less.

The breakdown voltage VB (unit: V) was the voltage value at a speed of voltage rising of 100 V/sec and a detection current of 10 mA. It was preferably 70V or more.

The DC equivalent resistance ESR (unit: mΩ) was measured by measuring the frequency-ESR characteristic by an impedance analyzer (HP 4194A) under conditions of a measurement voltage of 1 Vrms and reading the value of the smallest impedance. It was preferably 20 mΩ or less.

Note that the values of these characteristics were found from the averages of the values measured using n=10 number of samples. Among the electrical characteristics, the results of the electrostatic capacity and dielectric loss are shown in Table 1. Note that in Table 1, "good" in the column of "evaluation" indicates that good results were exhibited for all characteristics except breakdown voltage and DC equivalent resistance. "Poor" indicates that good results could not be obtained for one or more of the characteristics except breakdown voltage and DC equivalent resistance.

TABLE 1

|  | Ni particle size (nm) | Coating layer thickness (nm) | t0/d0 (%) | Electrostatic capacity (µF) | tan δ | Evaluation |
|---|---|---|---|---|---|---|
| Comp. Ex. 1-1 | 100 | 0 | 0 | 0.78 | 0.04 | Poor |
| Ex. 11 | 100 | 5 | 5 | 1.02 | 0.03 | Good |
| Ex. 12 | 100 | 5 | 5 | 1.03 | 0.04 | Good |
| Ex. 13 | 100 | 5 | 5 | 1.09 | 0.03 | Good |

Comparative Example 1-1

Except for using Ni powder not formed with the coating layers 52 shown in FIG. 2, the same procedure was followed as in Example 11 to prepare and measure a capacitor sample. The results are shown in Table 1.

Example 12

Except for using the conductive particles obtained by the method shown in Example 2, the same procedure was followed as in Example 11 to prepare and measure a capacitor sample. The results are shown in Table 1.

Example 13

Except for using conductive particles obtained by the method shown in Example 3, the same procedure was followed as in Example 11 to prepare and measure a capacitor sample. The results are shown in Table 1.
Evaluation As shown in Table 1, the efficacy of the present invention was confirmed.

Comparative Example 2

As the conductive particles 50, crushed powder of a thin film of an alloy of Ni and Pt prepared in the same way as the method described in Example 2 of Patent Document 3 was used. This alloy powder was prepared by the sputtering method, so a sputtering step and pulverizing step were added to the production and the production process became longer.

Comparative Example 3

Conductive particles 50 were prepared in the same way as the method described in Example 3 of Patent Document 3. This method was similar to the method described in Comparative Example 1, but the conditions were changed. By doing so, while the yield was poor, particles coated with a precious metal could be obtained. However, with this method, when using fine Ni particles, coating became difficult and segregated coarse Pt particles were formed. In the case of Ni particles of a size of 100 nm, there was a small amount of recoverable coated particles, but these were used as the conductive particles 50.

Examples 14 to 17

Except for changing the thickness t0 of the coating layers 52 to 1 to 15 nm in range, the same procedure was followed as in Example 13 to fabricate and measure capacitor samples. The results are shown in Table 2. The criteria for evaluation are the same as in Table 1.

Comparative Example 1-2

Except for making the thickness t0 of the coating layers 52 23 nm, the same procedure was followed as in Example 13 to fabricate and measure a capacitor sample. The results are shown in Table 2.

Comparative Example 2-1

Except for using the internal electrode layer conductive paste prepared in Comparative Example 2, the same procedure was followed as in Example 13 to prepare a capacitor sample and similarly measure it. The results are shown in Table 2. The criteria for evaluation are the same as in Table 1.

Comparative Example 3-1

Except for using the conductive particles prepared in Comparative Example 3, the same procedure was followed as in Example 13 to fabricate and measure a capacitor sample. The results are shown in Table 2. The criteria for evaluation are the same as in Table 1.

TABLE 2

|  | Ni particle size (nm) | Coating layer thickness (nm) | Amount of Pt (mol %) | t0/d0 (%) | Electro-static capacity (μF) | tan δ | Evaluation |
| --- | --- | --- | --- | --- | --- | --- | --- |
| Comp. Ex. 1-1 | 100 | 0 | 0 | 0 | 0.78 | 0.04 | Poor |
| Ex. 14 | 100 | 3 | 0.2 | 3 | 1.04 | 0.03 | Good |
| Ex. 15 | 100 | 5 | 1.0 | 5 | 1.09 | 0.03 | Good |
| Ex. 16 | 100 | 8 | 6.5 | 8 | 1.07 | 0.04 | Good |
| Ex. 17 | 100 | 15 | 15 | 15 | 1.02 | 0.09 | Good |
| Comp. Ex. 1-2 | 100 | 23 | 26.3 | 23 | 0.94 | 0.17 | Poor |
| Comp. Ex. 2-1 | 100 | — | 1.0 | — | 1.07 | 0.03 | Good |
| Comp. Ex. 3-1 | 100 | 5 | 1.0 | 5 | 0.81 | 0.03 | Poor |

Examples 18 to 21

Except for replacing the Pt chloride hydrate with the use of Re trichloride hydrate to form coating layers 52 having a thickness t0 changed to 1 to 15 nm in range, the same procedure was followed as in Example 13 to fabricate and measure a capacitor sample. The results are shown in Table 3. The criteria for evaluation are the same as in Table 1.

Comparative Example 1-3

Except for replacing the Pt chloride hydrate with the use of Re trichloride hydrate to form coating layers 52 having a thickness t0 of 25 nm, the same procedure was followed as in Example 13 to fabricate and measure a capacitor sample. The results are shown in Table 3. The criteria for evaluation are the same as in Table 1.

Comparative Example 2-2

Except for replacing the Pt with Re for fabrication of the sputtering target, the same procedure was followed as in Comparative Example 2 to prepare a conductive paste. The same procedure was followed as in Example 13 to fabricate and measure a capacitor sample. The results are shown in Table 3. The criteria for evaluation are the same as in Table 1.

Comparative Example 3-2

Except for replacing the Pt chloride hydrate with the use of Re trichloride hydrate, the same procedure was followed as in Comparative Example 3 to obtain conductive particles. The same procedure was followed as in Example 13 to fabricate and measure a capacitor sample. The results are shown in Table 3. The criteria for evaluation are the same as in Table 1.

TABLE 3

| | Ni particle size (nm) | Coating layer thickness (nm) | Amount of Re (mol %) | t0/d0 (%) | Electrostatic capacity (μF) | tan δ | Evaluation |
|---|---|---|---|---|---|---|---|
| Comp. Ex. 1-1 | 100 | 0 | 0 | 0 | 0.78 | 0.04 | Poor |
| Ex. 18 | 100 | 4 | 0.2 | 4 | 1.03 | 0.04 | Good |
| Ex. 19 | 100 | 6 | 1.0 | 6 | 1.07 | 0.04 | Good |
| Ex. 20 | 100 | 8 | 3.6 | 8 | 1.05 | 0.04 | Good |
| Ex. 21 | 100 | 15 | 14.8 | 15 | 1.03 | 0.09 | Good |
| Comp. Ex. 1-3 | 100 | 25 | 26.2 | 25 | 0.97 | 0.15 | Poor |
| Comp. Ex. 2-2 | 100 | — | 1.0 | — | 1.04 | 0.04 | Good |
| Comp. Ex. 3-2 | 100 | 6 | 1.0 | 6 | 0.81 | 0.03 | Poor |

Examples 22 to 25

Except for replacing the Pt chloride hydrate with the use of Re pentachloride hydrate to form coating layers 52 having a thickness t0 changed to 1 to 15 nm in range, the same procedure was followed as in Example 13 to fabricate and measure capacitor samples. The results are shown in Table 4. The criteria for evaluation are the same as in Table 1.

Comparative Example 1-4

Except for replacing the Pt chloride hydrate with use of Re pentachloride hydrate to form a coating layer 52 having a thickness t0 of 22 nm, the same procedure was followed as in Example 13 to fabricate and measure a capacitor sample. The results are shown in Table 4.

Comparative Example 2-3

Except for replacing the Pt with Re for fabrication of the sputtering target, the same procedure was followed as in Comparative Example 2 to prepare a conductive paste. The same procedure was followed as in Example 13 to fabricate and measure a capacitor sample. The results are shown in Table 4. The criteria for evaluation are the same as in Table 1.

Comparative Example 3-3

Except for replacing the Pt chloride hydrate with the use of Re pentachloride hydrate, the same procedure was followed as in Comparative Example 3 to obtain conductive particles. The same procedure was followed as in Example 13 to fabricate and measure a capacitor sample. The results are shown in Table 4. The criteria for evaluation are the same as in Table 1.

Examples 26 to 29

Except for replacing the Pt chloride hydrate with the use of Rh chloride hydrate to form coating layers 52 having a thickness to changed to 1 to 15 nm in range, the same procedure was followed as in Example 13 to fabricate and measure capacitor samples. The results are shown in Table 5. The criteria for evaluation are the same as in Table 1.

Comparative Example 1-5

Except for replacing the Pt chloride hydrate with the use of Rh chloride hydrate to form a coating layer 52 having a thickness t0 of 24 nm, the same procedure was followed as in Example 13 to fabricate and measure a capacitor sample. The results are shown in Table 5.

Comparative Example 2-4

Except for replacing the Pt with Rh for fabrication of the sputtering target, the same procedure was followed as in Comparative Example 2 to prepare a conductive paste. The same procedure was followed as in Example 13 to fabricate and measure a capacitor sample. The results are shown in Table 5. The criteria for evaluation are the same as in Table 1.

Comparative Example 3-4

Except for replacing the Pt chloride hydrate with the use of Rh chloride hydrate, the same procedure was followed as in Comparative Example 3 to obtain conductive particles. The same procedure was followed as in Example 13 to fabricate and measure a capacitor sample. The results are shown in Table 5. The criteria for evaluation are the same as in Table 1.

TABLE 4

| | Ni particle size (nm) | Coating layer thickness (nm) | Amount of Re (mol %) | t0/d0 (%) | Electrostatic capacity (μF) | tan δ | Evaluation |
|---|---|---|---|---|---|---|---|
| Comp. Ex. 1-1 | 100 | 0 | 0 | 0 | 0.78 | 0.04 | Poor |
| Ex. 22 | 100 | 4 | 0.2 | 4 | 1.05 | 0.04 | Good |
| Ex. 23 | 100 | 6 | 1.0 | 6 | 1.08 | 0.04 | Good |
| Ex. 24 | 100 | 8 | 3.6 | 8 | 1.04 | 0.04 | Good |
| Ex. 25 | 100 | 15 | 14.8 | 15 | 1.02 | 0.09 | Good |
| Comp. Ex. 1-4 | 100 | 22 | 26.2 | 22 | 0.97 | 0.15 | Poor |
| Comp. Ex. 2-3 | 100 | — | 1.0 | — | 1.04 | 0.04 | Good |
| Comp. Ex. 3-3 | 100 | 6 | 1.0 | 6 | 0.81 | 0.03 | Poor |

TABLE 5

|  | Ni particle size (nm) | Coating layer thickness (nm) | Amount of Rh (mol %) | t0/d0 (%) | Electrostatic capacity (μF) | tan δ | Evaluation |
|---|---|---|---|---|---|---|---|
| Comp. Ex. 1-1 | 100 | 0 | 0 | 0 | 0.78 | 0.04 | Poor |
| Ex. 26 | 100 | 2 | 0.2 | 2 | 1.05 | 0.03 | Good |
| Ex. 27 | 100 | 5 | 1.0 | 5 | 1.04 | 0.04 | Good |
| Ex. 28 | 100 | 8 | 3.8 | 8 | 1.03 | 0.05 | Good |
| Ex. 29 | 100 | 15 | 18.4 | 15 | 1.00 | 0.09 | Good |
| Comp. Ex. 1-5 | 100 | 24 | 39.9 | 24 | 0.97 | 0.19 | Poor |
| Comp. Ex. 2-4 | 100 | — | 1.0 | — | 1.05 | 0.04 | Good |
| Comp. Ex. 3-4 | 100 | 5 | 1.0 | 5 | 0.80 | 0.03 | Poor |

Examples 30 to 33

Except for replacing the Pt chloride hydrate with the use of Ru chloride hydrate to form coating layers 52 having a thickness t0 changed to 1 to 15 nm in range, the same procedure was followed as in Example 13 to fabricate and measure capacitor samples. The results are shown in Table 6. The criteria for evaluation are the same as in Table 1.

Comparative Example 1-6

Except for replacing the Pt chloride hydrate with the use of Ru chloride hydrate to form coating layers 52 having a thickness t0 of 25 nm, the same procedure was followed as in Example 13 to fabricate and measure a capacitor sample. The results are shown in Table 6.

Comparative Example 2-5

Except for replacing the Pt with Ru for fabrication of the sputtering target, the same procedure was followed as in Comparative Example 2 to prepare a conductive paste. The same procedure was followed as in Example 13 to fabricate and measure a capacitor sample. The results are shown in Table 6. The criteria for evaluation are the same as in Table 1.

Comparative Example 3-5

Except replacing the Pt chloride hydrate with the use of Ru chloride hydrate, the same procedure was followed as in Comparative Example 3 to obtain conductive particles. The same procedure was followed as in Example 13 to fabricate and measure a capacitor sample. The results are shown in Table 6. The criteria for evaluation are the same as in Table 1.

TABLE 6

|  | Ni particle size (nm) | Coating layer thickness (nm) | Amount of Ru (mol %) | t0/d0 (%) | Electrostatic capacity (μF) | tan δ | Evaluation |
|---|---|---|---|---|---|---|---|
| Comp. Ex. 1-1 | 100 | 0 | 0 | 0 | 0.78 | 0.04 | Poor |
| Ex. 30 | 100 | 3 | 0.2 | 3 | 1.03 | 0.04 | Good |
| Ex. 31 | 100 | 6 | 1.0 | 6 | 1.05 | 0.05 | Good |
| Ex. 32 | 100 | 8 | 3.8 | 8 | 1.02 | 0.05 | Good |
| Ex. 33 | 100 | 15 | 18.4 | 15 | 0.99 | 0.09 | Good |
| Comp. Ex. 1-6 | 100 | 25 | 39.9 | 25 | 0.99 | 0.17 | Poor |
| Comp. Ex. 2-5 | 100 | — | 1.0 | — | 1.06 | 0.04 | Good |
| Comp. Ex. 3-5 | 100 | 6 | 1.0 | 6 | 0.81 | 0.03 | Poor |

Evaluation

As shown in Tables 2 to 6, in the samples of the examples, when using as the water-soluble metal salt any of Pt chloride, Re trichloride, Re pentachloride, Rh chloride, and Ru chloride, when t0/d0 is in the range of 0<t0/d0≦0.15 (15%), an electrostatic capacity C of 0.9 μF or more and a dielectric loss tan δ of less than 0.1 can be realized. In particular, when t0/d0 is in the range of 0<t0/d0≦0.08 (8%), the tan δ is 0.05 or less, which is more preferable.

Further, the samples of Comparative Example 2 gave good results, but the samples of Comparative Example 3 fell in electrostatic capacity. With the method of production of conductive particles according to Comparative Example 3, when making the size of the Ni particles 100 nm, production of coated particles becomes difficult. Further, the characteristics also become degraded. Therefore, the conductive particles according to Comparative Example 3 were not evaluated further.

Examples 15 to 17, 19 to 21, 23 to 25, 27 to 29, 31 to 33

The above prepared samples of Examples 15 to 17, 19 to 21, 23 to 25, 27 to 29, and 31 to 33 were evaluated for electrode coverage rate and electrical characteristics (breakdown voltage VB and DC equivalent resistance ESR). The results are shown in Tables 7 to 11.

Comparative Examples 2-6 to 2-15

In the same way as above, except for changing the precious metal element of the sputtering target and making the content of precious metal of the coated particles the same as that prepared in Examples 15 to 17, 19 to 21, 23 to 25, 27 to 29, and 31 to 33, the same procedure was followed as in Comparative Example 2 to prepare conductive pastes. Further, the same procedure was followed as in Example 13 to prepare capacitor samples and measure them for electrode coverage rate, breakdown voltage, and DC equivalent resistance. The results are shown in Tables 7 to 11.

TABLE 7

| | Pt coating thickness (nm) | Amount of Pt (mol %) | Electrode coverage rate (%) | Breakdown voltage (V) | DC equivalent resistance (mΩ) |
|---|---|---|---|---|---|
| Comp. Ex. 1-1 | 0 | 0 | 62 | 110 | 8.1 |
| Ex. 15 | 5 | 1.0 | 82 | 159 | 8.5 |
| Comp. Ex. 2-1 | — | 1.0 | 76 | 141 | 9.0 |
| Ex. 16 | 10 | 6.5 | 87 | 172 | 11.5 |
| Comp. Ex. 2-6 | — | 6.5 | 78 | 145 | 12.5 |
| Ex. 17 | 15 | 15.0 | 89 | 178 | 13.5 |
| Comp. Ex. 2-7 | — | 15.0 | 80 | 149 | 17.2 |

TABLE 8

| | Re coating thickness (nm) | Amount of Re (mol %) | Electrode coverage rate (%) | Breakdown voltage (V) | DC equivalent resistance (mΩ) |
|---|---|---|---|---|---|
| Comp. Ex. 1-1 | 0 | 0 | 62 | 110 | 8.1 |
| Ex. 19 | 6 | 1.0 | 83 | 160 | 8.4 |
| Comp. Ex. 2-2 | — | 1.0 | 78 | 142 | 9.1 |
| Ex. 20 | 8 | 6.4 | 88 | 173 | 11.4 |
| Comp. Ex. 2-8 | — | 6.4 | 80 | 147 | 14.8 |
| Ex. 21 | 15 | 14.8 | 90 | 180 | 13.3 |
| Comp. Ex. 2-9 | — | 14.8 | 81 | 151 | 18.0 |

TABLE 9

| | Re coating thickness (nm) | Amount of Re (mol %) | Electrode coverage rate (%) | Breakdown voltage (V) | DC equivalent resistance (mΩ) |
|---|---|---|---|---|---|
| Comp. Ex. 1-1 | 0 | 0 | 62 | 110 | 8.1 |
| Ex. 23 | 6 | 1.0 | 83 | 159 | 8.4 |
| Comp. Ex. 2-3 | — | 1.0 | 77 | 139 | 9.1 |
| Ex. 24 | 8 | 6.4 | 87 | 172 | 11.5 |
| Comp. Ex. 2-10 | — | 6.4 | 79 | 145 | 14.8 |
| Ex. 25 | 15 | 14.8 | 88 | 179 | 13.6 |
| Comp. Ex. 2-11 | — | 14.8 | 81 | 150 | 18.0 |

TABLE 10

| | Rh coating thickness (nm) | Amount of Rh (mol %) | Electrode coverage rate (%) | Breakdown voltage (V) | DC equivalent resistance (mΩ) |
|---|---|---|---|---|---|
| Comp. Ex. 1-1 | 0 | 0 | 62 | 110 | 8.1 |
| Ex. 27 | 5 | 1.0 | 79 | 147 | 8.5 |
| Comp. Ex. 2-4 | — | 1.0 | 73 | 131 | 8.9 |
| Ex. 28 | 8 | 7.0 | 83 | 161 | 12.0 |
| Comp. Ex. 2-12 | — | 7.0 | 77 | 141 | 13.8 |
| Ex. 29 | 15 | 18.4 | 85 | 169 | 14.1 |
| Comp. Ex. 2-13 | — | 18.4 | 79 | 149 | 16.3 |

TABLE 11

| | Ru coating thickness (nm) | Amount of Ru (mol %) | Electrode coverage rate (%) | Breakdown voltage (V) | DC equivalent resistance (mΩ) |
|---|---|---|---|---|---|
| Comp. Ex. 1-1 | 0 | 0 | 62 | 110 | 8.1 |
| Ex. 31 | 6 | 1.0 | 78 | 145 | 8.3 |
| Comp. Ex. 2-5 | — | 1.0 | 71 | 129 | 9.0 |
| Ex. 32 | 8 | 7.0 | 81 | 153 | 9.0 |
| Comp. Ex. 2-14 | — | 7.0 | 73 | 134 | 12.3 |
| Ex. 33 | 15 | 18.4 | 85 | 167 | 14.1 |
| Comp. Ex. 2-15 | — | 18.4 | 78 | 145 | 17.8 |

Evaluation

From Tables 7 to 11, it is learned that if the precious, metal content is the same, the examples of the present invention are larger in electrode coverage rate compared with the comparative examples. As a result, it could be confirmed that good results were obtained for the breakdown voltage and DC equivalent resistance as well and the characteristics were improved.

Further, the method of production of conductive particles according to Comparative Example 2 increased the number of steps such as the sputtering, so became longer in production process than the method of production of conductive particles according to the present invention. Therefore, by employing the method of production of conductive particles according to the present invention, the production efficiency is improved.

Further, with the method of production of conductive particles according to Comparative Example 3, the core particles become smaller in size, so the number of conductive particles comprised of segregated precious metal increases, obtaining particles coated with precious metal becomes difficult, and the characteristics deteriorate in some cases.

However, with the method of production of conductive particles according to the present invention, by adding a reducing agent and a dispersion agent in the coating step, even if the core particles become smaller in size, it becomes possible to efficiently and stably produce conductive particles having less segregation and thinner coating layers than those by the method of production of conductive particles according to Comparative Example 3.

The invention claimed is:

1. A method of production of a conductive particle comprising a core having nickel as its main ingredient and a coating layer covering said core, said method of production of a conductive particle comprising:

a dispersion preparation step of preparing an aqueous dispersion containing a core powder for forming said core, a water-soluble metal salt comprising a metal or alloy for forming said coating layer, and a surfactant;

a reduction deposition step of mixing said aqueous dispersion and a reducing agent to cause a metal or alloy for forming said coating layer to be deposited by reduction on the outer surface of said core powder; and a heat treatment step of heat-treating said core powder, on which said coating layer is formed on the outer surface, under conditions of a heat treatment temperature of 200 to 400° C. and an oxygen partial pressure of $10^{-23}$ Pa or less after the reduction deposition step, the metal or alloy for forming said coating layer being comprised of a metal or alloy having at least one element selected from the group consisting of ruthenium (Ru), rhodium (Rh), rhenium (Re), and platinum (Pt) as a main ingredient.

2. The method of production of a conductive particle as set forth in claim 1, wherein said surfactant is a non-ionic surfactant and has a hydrophilic lipophilic balance of 8 to 20.

3. The method of production of a conductive particle as set forth in claim 1, wherein said surfactant is included in an amount of 0.001 to 1 part by weight with respect to 100 parts by weight of water in said aqueous dispersion.

4. A method of production of a conductive particle comprising core having nickel as its main ingredient and coating layer covering around said core, the method of production of a conductive particle comprising:
a dispersion preparation step of preparing an aqueous dispersion containing a core powder for forming said core, a water-soluble metal salt including a metal or alloy for forming said coating layer, and a water-soluble polymer compound;
a reduction deposition step of mixing said aqueous dispersion and a reducing agent to cause a metal or alloy for forming said coating layer to be deposited by reduction on the outer surface of said core powder; and
a heat treatment step of heat-treating said core powder, on which said coating layer is formed on the outer surface, under conditions of a heat treatment temperature of 200 to 400° C. and an oxygen partial pressure of $10^{-23}$ Pa or less after the reduction deposition step,
the metal or alloy for forming said coating layer being comprised of a metal or alloy having at least one element selected from the group consisting of ruthenium (Ru), rhodium (Rh), rhenium (Re), and platinum (Pt) as a main ingredient.

5. The method of production of a conductive particle as set forth in claim 4, wherein said water-soluble polymer compound is at least any one of an acrylic acid ester polymer, methacrylic acid ester polymer, or copolymer of an acrylic acid ester and methacrylic acid ester,
a molecular weight of the water-soluble polymer compound is 50,000 to 200,000, and
an acid value of the water-soluble polymer compound is in the range of 3 mgKOH/g to 20 mgKOH/g.

6. The method of production of a conductive particle as set forth in claim 4, wherein said water-soluble polymer compound is included in an amount of 0.001 to 1 part by weight with respect to 100 parts by weight of water in said aqueous dispersion.

7. The method of production of a conductive particle as set forth in claim 5, wherein said water-soluble polymer compound is polyvinyl alcohol.

8. The method of production of a conductive particle as set forth in claim 1, wherein the metal or alloy for forming said coating layer is deposited by reduction on the outer surface of said core powder so that said coating layer covers at least part of the outer surface of said core.

9. The method of production of a conductive particle as set forth in claim 1, wherein the metal or alloy for forming said coating layer is deposited by reduction on the outer surface of said core powder so that when a representative length of said core is d0 and the thickness of said coating layer is t0, $0<t0/d0\leq0.15$.

10. The method of production of a conductive particle as set forth in claim 9, wherein the metal or alloy for forming said coating layer is deposited by reduction on the outer surface of said core powder so that $0<t0/d0\leq0.08$.

11. The method of production of a conductive particle as set forth in claim 1, wherein said core powder comprises at least one member selected from the group consisting of a spherical, flake, projection, and amorphous shape powder, with a representative length in the range of 10 to 200 nm.

12. The method of production of a conductive particle as set forth in claim 1, wherein the thickness of the coating layer is in the range of 1 to 15 nm.

13. The method of production of a conductive particle as set forth in claim 1, wherein said dispersion preparation step and said reduction deposition step are performed in an atmosphere with an oxygen content of 0.01 vol % or less.

14. The method of production of a conductive particle as set forth in claim 1, wherein the content of the water-soluble metal salt in said aqueous dispersion is 0.01 to 1 part by weight with respect to 100 parts by weight of water.

15. The method of production of a conductive particle as set forth in claim 1, wherein said water-soluble metal salt is at least one member selected from the group consisting of platinum chloride, rhodium chloride, rhenium pentachloride, rhenium trichloride, and ruthenium chloride.

16. The method of production of a conductive particle as set forth in claim 1, wherein the content of the reducing agent in said aqueous dispersion is 0.1 to 10 parts by weight with respect to 100 parts by weight of water.

17. The method of production of a conductive particle as set forth in claim 1, wherein said reducing agent is at least one member selected from the group consisting of hydrazine, hypophosphorous acid, and formic acid.

18. The method of production of a conductive particle as set forth in claim 1, wherein the metal or alloy for forming said coating layer is deposited by reduction on the outer surface of said core powder so that the content of nickel in the finally obtained conductive particle becomes 87 mol % to less than 100 mol % and the content of metal or alloy forming said coating layers becomes greater than 0 and less than 13 mol %.

19. A method of production of an electronic device having an internal electrode layer and a dielectric layer, comprising steps of:
producing a conductive particle by the method as set forth in claim 1,
producing a green sheet forming said dielectric layers after firing,
forming an electrode paste layer for forming said internal electrode layer on the surface of said green sheet using a conductive paste containing the conductive particle,
stacking green sheet on which said electrode paste layer are formed to form a stack, and
firing said stack in an atmosphere of an oxygen partial pressure of $10^{-10}$ to $10{-2}$ Pa.

* * * * *